March 29, 1949.  G. S. BURROUGHS  2,465,350
DIRECTION FINDER

Filed May 21, 1945  2 Sheets-Sheet 1

INVENTOR.
GORDON S. BURROUGHS
BY
ATTORNEY

March 29, 1949.    G. S. BURROUGHS    2,465,350
DIRECTION FINDER
Filed May 21, 1945    2 Sheets-Sheet 2
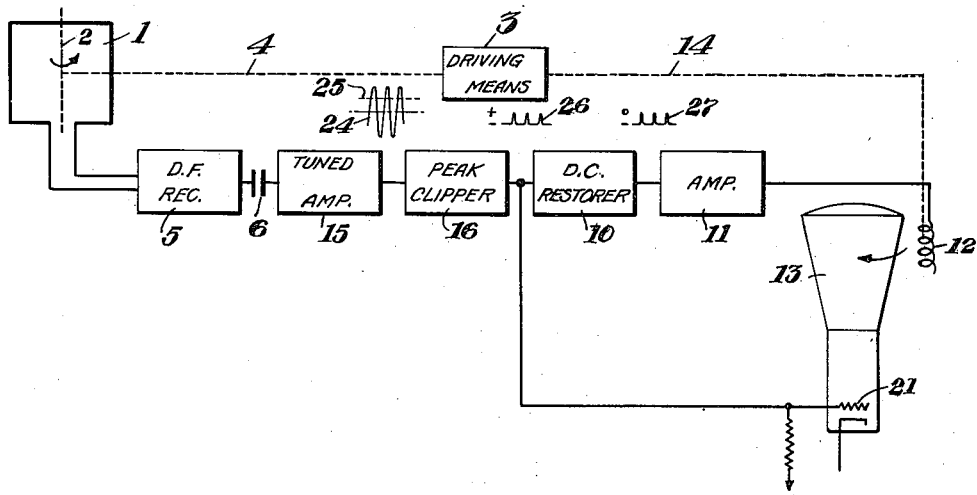
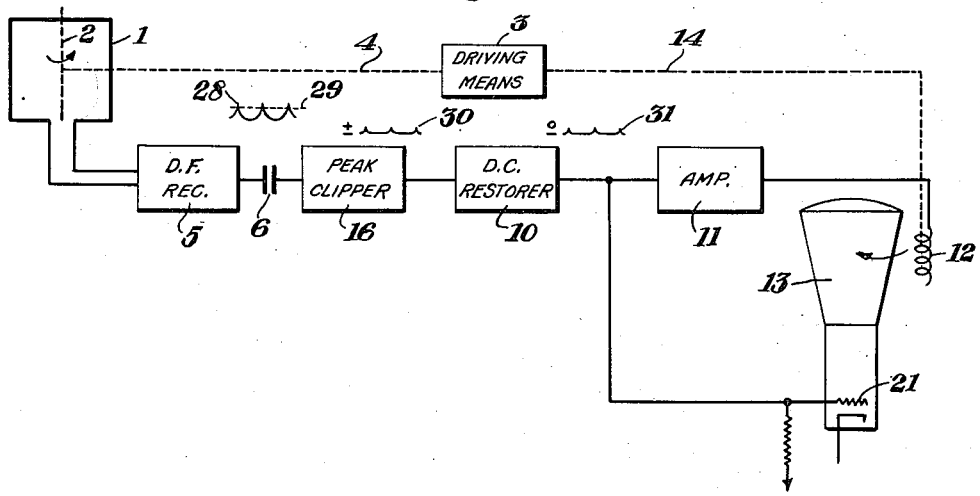
INVENTOR.
GORDON S. BURROUGHS
BY Percy P. Lantz
ATTORNEY Patented Mar. 29, 1949

2,465,350

UNITED STATES PATENT OFFICE 2,465,350

DIRECTION FINDER

Gordon S. Burroughs, Forest Hills, N. Y., assignor to Federal Telephone and Radio Corporation, New York, N. Y., a corporation of Delaware Application May 21, 1945, Serial No. 594,861

14 Claims. (Cl. 343—118)

1

The present invention relates to direction finders, particularly of the type utilizing cathode ray oscillograph tubes in the form of an inverted figure-of-eight or double-lobed pattern, in which the outer ends correspond to the nulls of the radiant action pattern of the antenna system. If the null is not sharp, the outer ends of the lobed pattern become rounded and also tend to pull in away from the scale around the circumference of the screen thus making directional readings difficult. Various other causes produce blurring or rounding of the outer ends of the lobed pattern or pulling away of said ends from the scale. Noise, for example, tends to mask the lobed pattern and frequently obscures the directional indication.

An object of the present invention is the provision of an improved direction finder giving improved directional indications.

Another object of the present invention is the provision of a direction finder in which the usual lobed or inverted figure-of-eight pattern on the screen of the cathode ray oscillograph tube is replaced by a straight line.

Another object of the present invention is the provision of an improved direction finder in which accurate directional indications are obtained despite a relatively high noise level.

A further object of the present invention is the provision of a direction finder in which the pattern on the oscilloscope screen always has its outer ends or points on the edge of the screen adjacent the calibration so that the directional reading may be readily and accurately made.

Other and further objects of the present invention will become apparent and the invention will be best understood from the following description of an embodiment thereof, reference being had to the drawings in which:

Fig. 3 is a modified embodiment of a direction finder embodying my invention; and Fig. 4 is another modified form of a direction finder embodying my invention.

In systems of the type to which this application has reference, directive radiant action patterns are rotated and the circular sweep of a cathode ray oscillograph tube is rotated synchronously therewith. Energy picked up from a transmitter produces in the output of the direction finding receiver a waveform similar to a full wave rectified sine wave having cusps repeated at a

2 frequency twice the frequency of rotation of the radiant action patterns. In the prior art the output of the direction finding receiver is then applied to deflecting means in the cathode ray tube to produce an inverted figure-of-eight or double lobed pattern. In accordance with one aspect of my invention the cusps of the output of the D. F. receiver are sharpened to produce sharp pulses. These are applied to the deflecting means to cause a thin line radial deflection of the circular trace and are also used to substantially simultaneously cause the unblocking of the cathode ray tube and thus light the screen. Consequently a thin line of light is produced on the screen indicating the line of direction. The foregoing and other aspects of my invention will become apparent from the following description of the embodiments thereof in which the same numeral is used for corresponding parts of all the figures. Furthermore the curves in Fig. 2 and the other figures are not intended to have any exact quantitative significance, but are merely an aid in describing the operation of the systems mentioned herein.

Figure 1:
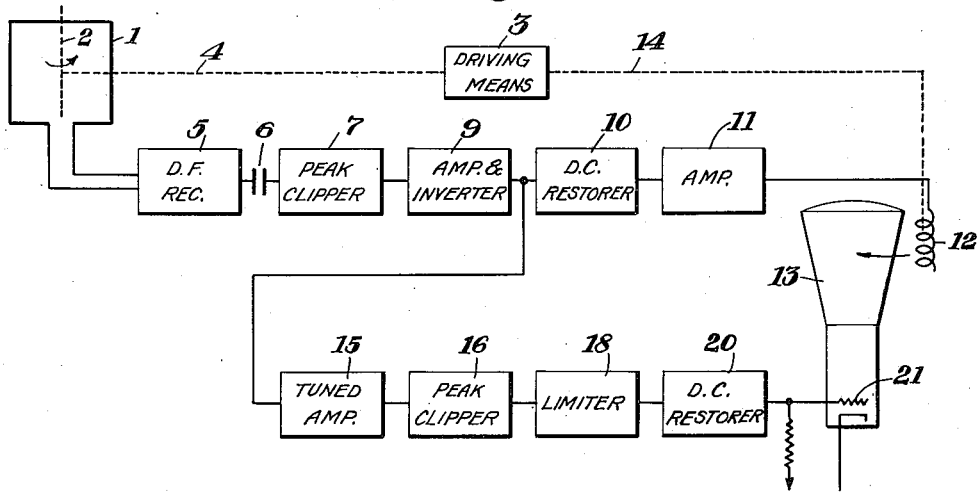
Fig. 1 is a block diagram of a direction finder embodying my invention.
Figure 2:
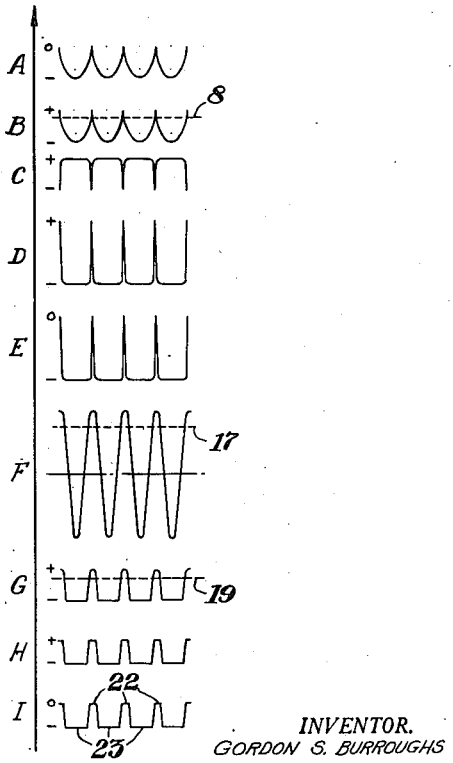
Fig. 2 is a set of curves used in the explanation of the operation of the direction finder of Fig. 1.

Referring now to Fig. 1, a continuously shifting or rotating radiant action pattern in the form of a figure-of-eight is produced by means of a rotatable loop 1 adapted to rotate around a vertical axis 2 and driven by a driving means 3 as indicated by the broken line 4. The output of the loop 1 is applied to a direction finding receiver 5 whose output is in the shape of a full wave rectified sine wave as illustrated in curve A Fig. 2, the cusps of which correspond to the nulls of the figure-of-eight pattern. Waveform A, a pulsing direct current, is fed by means of coupling condenser 6 to a peak clipper 7, the input to said clipper being in the form of an alternating current waveform B (Fig. 2). Peak clipper 7 cuts off the cusps or peaks of wave B at a high level, as indicated by broken line 8 (Fig. 2) and passes said peaks so that they appear in the output of the clipper in the form indicated in waveform C, that is, these peaks are inverted and amplified. The output of peak clipper 7 is fed to an amplifier 9 of the type which inverts waveform C so that it appears amplified and inverted as in waveform D. The output of amplifier 9 is alternating current which is fed to a direct current restorer 10 which adjusts the peaks of the pulse of waveform D to a level of zero direct current potential with the troughs of said pulses being negative; as illustrated in waveform E. The output of the D. C. restorer 10 is then fed to the usual amplifier and inverter 11 forming part of the cathode ray oscillograph equipment, which amplifier feeds the deflecting coil 12 of a cathode ray oscillograph tube 13. The deflecting coil 12 is driven by the same driving means 3 which rotates the antenna and is rotated synchronously with the rotation of said loop antenna 1.

Amplifier 11 is normally conductive so that current normally flows through the deflecting coil 12 and deflects the spot to the outer circumference of the cathode ray tube screen. As the deflecting coil 13 is rotated the spot moves in a circle adjacent the outer circumference of the screen, thus producing a circular trace.

When a signal, as in waveform E, is impressed upon the amplifier 11, the spot will be at the outer circumference of the screen when the peaks of the pulses of said waveform are impressed on amplifier 11 since these peaks are at zero voltage D. C. The troughs between said pulses are negative and block conduction of the tube in amplifier 11, thus cutting off the current flow through deflecting coil 12 and permitting the spot to move to the center of the screen and remain there until the next peak is encountered. This movement of the spot from the outside of the screen to the center produces a thin line of light on the screen. Since the pulses occur at an interval corresponding to half a rotation of the deflecting coil around the tube, two opposite and aligned radial lines of light are produced which indicate the line of direction. The foregoing assumes that the cathode ray oscillograph tube 13 is conductive at the time the sharp pulses from D. C. restorer 10 are impressed upon amplifier 11. The conductivity of the cathode ray tube 13 is controlled in the following manner to effect this result.

If the cathode ray tube were conductive all the time, noise interferences would cause radial deflections of the circular trace and give false directional indications. In accordance with my invention, I provide an arrangement which causes the cathode ray tube 13 to light up only for a short length of time during which the pulses are being impressed on the amplifier 11 and the deflecting coil 3. For this purpose I connect the output of amplifier 9 with an amplifier 15 which is tuned to a frequency equal to twice the frequency at which the loop antenna 1 is rotated. The amplifier 15 may have a plate circuit tuned to said frequency. The tuned amplifier 15 gives an output in waveform F (Fig. 2) in which the noise components have been materially reduced due to the selectivity of the amplifier. The output of tuned amplifier 15 is then fed to a peak clipper 16 which clips and passes the peaks thereof above a level 17 indicated in waveform F to produce in its output waveform G. Peak clipper 16 may be of a diode type or any other type which does not invert the waveform. The output of peak clipper 16 is then fed to a limiter 18 which limits the amplitude of the wave G to the lever 16 of waveform G. The output of limiter 18 is illustrated in waveform H. Since this output is in the form of alternating current, it is then fed to a D. C. restorer 20 so that the flat tops of said waveform are at a zero direct current level, as in waveform I. The output of the D. C. restorer 20 is then impressed on the control electrode or grid 21 of the cathode ray oscillograph tube 13.

As stated hereinbefore, the cathode ray tube 13 is normally conductive. At the flat tops 22 of said waveform I, that is, at zero D. C. potential, the screen of the tube 13 will light. The troughs 23 of waveform I are however, sufficiently negative so as to blank out tube 13.

The pulses of waveform E occur at approximately the middle of the flat tops 22 of waveform I. Thus cathode ray tube 13 will be lit at the time said pulses are impressed on deflecting coil 12 and consequently a thin radial line of light will be produced on the screen of cathode ray tube 13. Because of the relatively greater width of the flat tops 22 of waveform I in comparison with the narrowness of the pulses of waveform E, if there is a shift in phase between the rotation of loop antenna 1 and the tuned amplifier 15, the radial line of light will still be visible on the screen of the cathode tube 13. Modulation as well as noise will not appear on the screen between pulses due to the blanking of the tube between said pulses.

Where, however, the arrangement is such that this phase shift is not likely to occur, an arrangement such as illustrated in Fig. 3 may be satisfactorily employed. In the embodiment of Fig. 3 the loop antenna 1 is coupled to the direction finding receiver 5 whose output is then applied to the tuned plate amplifier 15. The tuned plate amplifier 15 substantially reduces the noise and produces a sine wave output 24 which is then clipped in the peak clipper 16 at a high level 25 and then passed to thereby produce in the output of the clipper 16, sharp pulses indicated by the curve 26. These sharp alternating current pulses 26 are applied to the grid 21 of cathode ray tube 13 to brighten said tube, which is normally biased to cut-off. The pulses 26 are also used to deflect the spot after they have been passed through a D. C. restorer so that the peaks thereof are at zero potential as indicated by waveform 27. These pulses are applied to amplifier 11 whose output is applied to deflection coil 12 as in Fig. 1.

The system illustrated in Fig. 3 has the advantage that the screen 13 is only lit when the pulses are being applied to the deflecting coil to deflect the trace. Thus random noise and other modulation are eliminated.

A relatively simple system is illustrated in Fig. 4. In this system loop antenna 1 is coupled to direction finding receiver 5 whose output, curve 28, is then clipped in peak clipper 16 above the level 29 of curve 28 to pass the peaks and produce in its output a waveform such as illustrated in curve 30. This output, which is alternating current, is then applied to a D. C. restorer 10 to produce pulses, curve 31, with their peaks at zero D. C. level and troughs substantially negative. These pulses are then applied to the grid 21 of the cathode ray tube 13 to control the illumination of its screen, said tube being normally conductive. The pulses of waveform 31 are also applied to amplifier 11 whose output is connected to the deflecting coil 12 and thereby controls the deflection of the spot in a manner which will be understood from the foregoing description.

While I have described the details of embodiments of my invention, it will be apparent to those versed in the art that numerous changes may be made in these details without departing from the teachings thereof. For example, a sensing arrangement might be incorporated in the equipment here described in a manner which will be apparent to those versed in the art. Accordingly, while I have described above the principles of my invention in connection with specific apparatus, and particular modifications thereof, it is to be clearly understood that this description is made only by way of example and not as a limitation on the scope of my invention as defined in the accompanying claims.

I claim:

1. In a direction finding system comprising a directional antenna device coupled to a direction finding receiver with means for cyclically shifting the directional pattern of said device, means for deriving from the output of said receiver a train of sharp pulses having a repetition frequency determined by the rate at which said directional pattern is shifted, means establishing the positive peaks of said pulses at zero direct current potential level, a cathode ray oscillograph tube, means for deflecting the beam of said tube from the center of the screen of said tube and rotating it in a circle, and means applying the train of established pulses to said deflecting means to control the deflection of the beam so that the beam moves radially during each of said pulses substantially in a line extending from said circle toward the center of the screen.

2. In a direction finding system comprising a directional antenna device coupled to a direction finding receiver with means for rotating the directional pattern of said device at a given frequency, means for deriving from the output of said receiver a train of sharp pulses having a repetition frequency equal to a low integral multiple of said given frequency, means establishing the positive peaks of said pulses at zero direct current potential level, a cathode ray oscillograph tube, means for deflecting the beam of said tube from the center of the screen and rotating it in a circle at a frequency directly related to said given frequency, and means applying the train of established pulses to said deflecting means to control the deflection of the beam so that the beam moves radially during each of said pulses substantially in a line extending from said circle toward the center of the screen.

3. In a direction finding system comprising a directional antenna device coupled to a direction finding receiver with means for rotating the directional pattern of said device at a given frequency, means for deriving from the output of said receiver a train of sharp pulses having a repetition frequency equal to twice said given frequency, means establishing the positive peaks of said pulses at zero direct current potential level, a cathode ray oscillograph tube, means deflecting the beam of said tube from the center of the screen of said tube and rotating it in a circle at a frequency equal to said given frequency, and means applying the train of established pulses to said deflecting means to control the deflection of the beam so that the beam moves radially during each of said pulses substantially in a line extending from said circle toward the center of the screen.

4. In a direction finding system comprising a directional antenna device coupled to a direction finding receiver with means for rotating the directional pattern of said device, the output of said receiver being substantially in the form of a full wave rectified sine wave, means passing only the cusps of said receiver output to produce a train of sharp pulses each corresponding to one of said cusps, means establishing the positive peaks of said pulses at zero direct current potential level, a cathode ray oscillograph tube, means deflecting the beam of said tube from the center of the screen of said tube and rotating it in a circle at a frequency directly related to said given frequency, and means applying the train of established pulses to said deflecting means to control the deflection of the beam so that the beam moves radially at each of said pulses substantially in a line extending from said circle toward the center of the screen.

5. In a direction finding system comprising a directional antenna device coupled to a direction finding receiver with means for cyclically shifting the directional pattern of said device, means for deriving from the output of said receiver a train of sharp pulses having a repetition frequency determined by the rate at which said directional pattern is shifted, means establishing the positive peaks of said pulses at zero current potential level with the troughs between said pulses at a negative potential, a cathode ray oscillograph tube having a rotatable deflecting coil, means for rotating the deflecting coil at a speed related to said rate, an electron discharge device having a control element and normally conductive and providing in its output a direct current flow, means for applying said last named output to said deflecting coil, said direct current flow causing the deflection from the center of the screen of the beam which is rotated as the deflecting coil is rotated in a circle, and means applying the train of established pulses to said control element whereby the negative troughs inbetween said pulses diminish the conductivity of said electron discharge device so that the beam moves back toward the center of the screen inbetween said pulses and outwardly towards the circle during said pulses.

6. A direction finding system according to claim 1 further including means responsive to said sharp pulses controlling the conductivity of said cathode ray oscillograph tube.

7. A direction finding system according to claim 5 wherein said amplifier is tuned to a frequency equal to twice said given frequency and the repetition frequency is likewise equal to twice said given frequency.

8. In a direction finding system comprising a directional antenna device coupled to a direction finding receiver, with means for shifting the directional pattern of said device at a given frequency, means for deriving from the output of said receiver a train of sharp pulses having a repetition frequency equal to a low order integral multiple of the frequency at which said directional pattern is shifted, a direct current restorer, a cathode ray oscillograph tube, means deflecting the beam of said tube from the center of the screen of said tube and rotating it in a circle, means applying said sharp pulses through said direct current restorer to control the deflection of the beam, an amplifier tuned to a frequency equal to the repetition frequency of said sharp pulses, means applying said sharp pulses to said tuned amplifier, the output of said amplifier being in the form of a sine wave, and means responsive to the output of said amplifier controlling the conductivity of said cathode ray tube.

9. In a direction finding system comprising a directional antenna device coupled to a direction finding receiver with means for cyclically shifting the directional pattern of said device, the output of said receiver being substantially in the form of a full wave rectified sine wave, the cusps of which have a repetition frequency equal to a low order integral multiple of the frequency at which the directional pattern is shifted, an amplifier having its input connected to the output of said direction finding receiver, said amplifier being tuned to a frequency equal to said repetition frequency and providing at its output energy in the form of a sine wave, means for deriving from the output of said amplifier a train of pulses, said pulses corresponding to one set of peaks of said sine wave, a cathode ray oscillograph tube having a deflecting element and a control electrode, means for applying said sharp pulses to said control electrode, a direct current restorer establishing the positive peaks of said pulses at zero direct current potential level also having said train of pulses applied to its input, and means for applying the output of said direct current restorer to said deflecting element to control the deflection of the beam of said cathode ray tube.

10. In a direction finding system comprising a directional device coupled to a direction finding receiver with means for cyclically shifting the directional pattern of said device at a given frequency, means for deriving from the output of said receiver a train of sharp pulses having a repetition frequency equal to a low order integral multiple of said given frequency, means establishing the positive peaks of said pulses at zero direct current potential level, a cathode ray oscillograph tube having a control electrode and deflecting means, and means applying the train of established pulses to said deflecting means and to said control electrode to substantially simultaneously control the deflection of the beam and the conductivity of said cathode ray oscillograph tube.

11. In a direction finding system comprising a directional antenna device coupled to a direction finding receiver with means for cyclically shifting the directional pattern of said device, a cathode ray oscillograph tube, means cooperating with the said shifting means for moving the tube ray trace in a circular path on the tube screen, means responsive to the output energy from the receiver to produce a wave having sharp cusps of energy to deflect the ray trace linearly between said path and the screen center in accordance with the directional pattern, means normally maintaining said tube conductive whereby said linear deflection produce radial tracers and means utilizing the wave energy between said sharp cusps for blocking said tube between said deflection.

12. In a direction finding system comprising a directional antenna device coupled to a direction finding receiver with means for cyclically shifting the directional pattern of said device, a cathode ray oscillograph tube, means cooperating with the said shifting means for moving the tube ray trace in a circular path on the tube screen, means responsive to the output energy from the receiver and operating independently of the amplitude variations of said energy to deflect the ray trace linearly between said path and the screen center in accordance with the directional pattern, means normally maintaining said tube conductive whereby said linear deflection produce radial tracers, means for blocking said tube between said deflection, and means for converting the output energy from the receiver into sharp pulses for controlling the ray deflecting means.

13. In a system as set forth in claim 5 wherein said means for applying the train of established pulses comprises an amplifier tuned to a frequency equal to a low order integral multiple of said rate, and means for applying energy from said tuned amplifier to control the conductivity of said tube.

14. In a direction finding system comprising a directional antenna device coupled to a direction finding receiver, means for cyclically shifting the directional pattern of said device, a cathode ray oscillograph tube, means cooperating with said shifting means and independent of said receiver output for moving the tube ray trace in a circular path on the tube screen, pulse shaping means responsive to the output energy from said receiver and operating independently of the amplitude variation of said energy to produce pulse energy for deflecting said ray trace linearly between said path and the screen center in accordance with said directional pattern, and means synchronized with said pulse energy for blocking said tube between said deflection.

GORDON S. BURROUGHS.

REFERENCES CITED

The following references are of record in the file of this patent:

UNITED STATES PATENTS

| Number | Name | Date |
|---|---|---|
| 2,263,377 | Busignies | Nov. 18, 1941 |
| 2,272,607 | Higonnet | Feb. 10, 1942 |
| 2,388,262 | Ganiayre et al. | Nov. 6, 1945 |

FOREIGN PATENTS

| Number | Country | Date |
|---|---|---|
| 635,793 | Germany | Sept. 28, 1936 |